(12) United States Patent
Gibson

(10) Patent No.: US 7,419,126 B2
(45) Date of Patent: Sep. 2, 2008

(54) BRACKET

(75) Inventor: Sidney T. Gibson, Stratford (CA)

(73) Assignee: Sidney Gibson Limited, Stratford (CA)

( * ) Notice: Subject to any disclaimer, the term of this patent is extended or adjusted under 35 U.S.C. 154(b) by 281 days.

(21) Appl. No.: 11/181,764

(22) Filed: Jul. 15, 2005

(65) Prior Publication Data
US 2006/0231703 A1 Oct. 19, 2006

Related U.S. Application Data

(63) Continuation-in-part of application No. 11/086,308, filed on Mar. 23, 2005, now abandoned.

(51) Int. Cl.
A47B 96/06 (2006.01)
(52) U.S. Cl. .................... 248/220.1; 248/235
(58) Field of Classification Search .............. 248/220.1, 248/235, 250; 403/231, 169, 403; 52/27, 52/288.1, 282.3, 255, 287.1, 657, 656.1
See application file for complete search history.

(56) References Cited

U.S. PATENT DOCUMENTS

| 624,723 | A | | 5/1899 | Allis |
| 773,207 | A | | 10/1904 | Kaiser |
| 939,005 | A | * | 11/1909 | Goedeke ................ 217/69 |
| D47,283 | S | * | 5/1915 | Eagan ................... D8/380 |
| 1,380,518 | A | * | 6/1921 | Bellig .................. 403/219 |
| 1,919,300 | A | * | 7/1933 | Lewis ................. 52/288.1 |
| 2,051,241 | A | | 10/1936 | Biggers |
| 2,091,868 | A | | 10/1937 | Mattson |
| 2,465,635 | A | * | 3/1949 | Conterio ................ 108/42 |
| 2,859,879 | A | | 11/1958 | Rogers et al. |
| 2,878,053 | A | * | 3/1959 | Yuncker .................. 296/15 |
| 2,991,577 | A | * | 7/1961 | Bellocchio ............. 40/738 |
| 3,194,527 | A | | 7/1965 | Gruss |
| 3,692,265 | A | | 9/1972 | Barriger |

(Continued)

FOREIGN PATENT DOCUMENTS

WO       WO 82/03539       10/1982

(Continued)

OTHER PUBLICATIONS

Espacenet abstract of JP 2003079464, "Hanging Shelf", Y. Keitaro (Mar. 18, 2003).

(Continued)

*Primary Examiner*—Korie Chan
(74) *Attorney, Agent, or Firm*—Standley Law Group LLP

(57) ABSTRACT

A bracket has three rigid sides, at least two of the sides having equal length. Each of the three sides has ends lying in a plane defined by a longitudinal axis between the ends and a transverse axis perpendicular to the longitudinal axis. The sides are rigidly connected so that an equilateral or isosceles triangle is formed in a cross-sectional plane taken through the longitudinal axes of the three sides. The transverse axes of the three sides each independently form an angle of from about 50° to about 60° with the cross-sectional plane and meet at a common point not on the cross-sectional plane. One or more of the three sides have mounting points located on the longitudinal axis. Such a bracket can support a variety of different support structures (e.g. shelves, hanger bars and storage bins) on a surface, or reinforce a corner of a variety of different structures (e.g. boxes or walls).

26 Claims, 19 Drawing Sheets

U.S. PATENT DOCUMENTS

| | | | |
|---|---|---|---|
| D234,455 S | | 3/1975 | Blake |
| 4,129,080 A | | 12/1978 | Vall |
| 4,224,467 A | * | 9/1980 | Lewis et al. ............... 381/305 |
| 4,295,482 A | * | 10/1981 | McMullen ................ 135/90 |
| 4,393,568 A | * | 7/1983 | Navarro .................... 29/432 |
| 4,523,526 A | | 6/1985 | O'Neill |
| 4,536,995 A | * | 8/1985 | Frederick .................... 52/27 |
| 4,972,633 A | * | 11/1990 | Wright ....................... 52/27 |
| 5,064,158 A | | 11/1991 | Brazier et al. |
| 5,257,766 A | | 11/1993 | Riblet |
| D367,259 S | * | 2/1996 | Sachs ..................... D13/133 |
| 5,620,160 A | | 4/1997 | Grabe |
| 5,992,561 A | * | 11/1999 | Holben et al. ............ 181/295 |
| 6,053,465 A | | 4/2000 | Kluge |
| 6,148,566 A | * | 11/2000 | Giszpenc et al. ............ 52/27 |
| 6,722,620 B2 | | 4/2004 | Rieger |

OTHER PUBLICATIONS

CornerHardware.com web page (Jan. 27, 2005).
CabinetWare, "Shelf Supports", SH product line product sheets.
Organize-it.como web page (Jan. 27, 2001.

* cited by examiner ical plane, one or more of the three sides having first and second mounting points, the first mounting point located on the longitudinal axis at a first distance from the first end, and the second mounting point located on the longitudinal axis at a second distance from the second end.

BRACKET

CROSS-REFERENCE APPLICATIONS

This application is a continuation-in-part of U.S. patent application Ser. No. 11/086,308 filed Mar. 23, 2005, now abandoned the entire contents of which are herein incorporated by reference.

FIELD OF THE INVENTION

The present invention relates to brackets, particularly brackets for mounting support structures to surfaces.

DESCRIPTION OF RELATED ART

Brackets for mounting shelves and other support structures to wall surfaces and the like are well known in the art. Most such brackets are typically L-shaped with two sides meeting at a right angle, and may or may not have a third side occupying the hypotenuse of the right triangle formed by the sides of the bracket. The sides of such brackets may be made of rigid or flexible material. Typically, such brackets are affixed to the wall surface through one of the sides. Examples of this type of bracket are those disclosed in U.S. Design Patent 234,455, U.S. Pat. No. 4,523,526, World Patent Publication WO 82/03539, Japanese Patent 2003079464, U.S. Pat. No. 4,129,080, U.S. Pat. No. 5,257,766, U.S. Pat. No. 2,859,879, U.S. Pat. No. 6,053,465, U.S. Pat. No. 6,722,620, U.S. Pat. No. 5,620,160, U.S. Pat. No. 624,723, U.S. Pat. No. 5,064,158, U.S. Pat. No. 773,207 and various other commercially available brackets. Such brackets are adequate for some purposes but lack versatility, for example, they are difficult to mount in corners where two wall surfaces meet and they are generally usable in only a limited number of configurations or orientations.

For supporting shelves and other support structures in a corner where two surfaces meet, the prior art discloses several approaches. For example, a corner bracket based on the surface of a hyperbolic paraboloid is disclosed in U.S. Pat. No. 3,194,527. Such a bracket may also be used as a brace between framing members. However, this bracket lacks versatility as it is designed specifically for corners. Its use on a single vertical surface is limited and ungainly. Another example of a corner bracket is disclosed in U.S. Pat. No. 3,692,265. Here the bracket is constructed of sides which flex to jam the bracket into a corner. Sharp tabs on the bracket help secure the bracket in the corner. Such a bracket requires a corner and cannot be used on a single wall surface.

There remains a need in the art for a versatile, aesthetically appealing bracket for mounting support structures to surfaces.

SUMMARY OF THE INVENTION

According to an aspect of the invention, there is provided a bracket comprising three rigid sides, at least two of the sides having equal length, each of the three sides having interior and exterior surfaces, each of the three sides having first and second ends, the first and second ends lying in a plane defined by a longitudinal axis between the first and second ends and a transverse axis perpendicular to the longitudinal axis, the sides being rigidly connected so that an equilateral or isosceles triangle is formed in a cross-sectional plane taken through the longitudinal axes of the three sides, the transverse axes of the three sides each independently forming an angle of from about 50° to about 60° with the cross-sectional plane, the The three rigid sides may be continuously connected to each other, or there may be a break either at a corner where two sides meet or in one of the sides. The rigidity of the sides maintains the bracket's shape even when there is a break.

According to another aspect of the invention, there is provided a bracket comprising three rigid sides, at least two of the sides having equal length, each of the three sides having interior and exterior surfaces, each of the three sides having first and second ends, the first and second ends lying in a plane defined by a longitudinal axis between the first and second ends and a transverse axis perpendicular to the longitudinal axis, the sides being rigidly connected to each other at the ends so that an equilateral or isosceles triangle is formed in a cross-sectional plane taken through the longitudinal axes of the three sides, the transverse axes of the three sides each independently forming an angle of from about 50° to about 60° with the cross-sectional plane, the transverse axes of the three sides meeting at a common point not on the cross-sectional plane, one or more of the three sides having first and second mounting points, the first mounting point located on the longitudinal axis at a first distance from the first end, and the second mounting point located on the longitudinal axis at a second distance from the second end.

Preferably, the three rigid sides are of substantially equal length and a substantially equilateral triangle is formed in the cross-sectional plane. Preferably, the transverse axes of the three sides each independently form an angle of from about 51° to about 55°, for example about 52°, with the cross-sectional plane.

According to another aspect of the invention, there is provided a bracket comprising: a first axis, a second axis and a third axis meeting orthogonally at an origin, the first and second axes interiorly defining a first plane, the first and third axes interiorly defining a second plane and the second and third axes interiorly defining a third plane; a first rigid bracket surface defined on the first plane in contact with the first and second axes, a second rigid bracket surface defined on the second plane in contact with the first and third axes, a third rigid bracket surface defined on the third plane in contact with the second and third axes, the first bracket surface rigidly connected to the second bracket surface along the first axis, the first bracket surface rigidly connected to the third bracket surface along the second axis, the second bracket surface rigidly connected to the third bracket surface along the third axis; and first and second spaced-apart mounting points on the first bracket surface, the first mounting point perpendicularly offset from the first axis by a first distance, the first mounting point offset from the origin by a second distance, the second mounting point perpendicularly offset from the second axis by a distance equal to the first distance, the second mounting point offset from the origin by a distance equal to the second distance.

Brackets of the present invention are mounted on a surface (e.g. a vertical surface, for example a wall) by fastening means at the mounting points. Preferably, each mounting point comprises an aperture through which the fastening means is inserted. More preferably, each mounting point comprises an aperture having a boss for receiving the fastening means. The boss may be made of the same or different material as the bracket. The boss may be integrally formed with the bracket, separate from but immovably secured in the bracket, or separate from and removably secured in the bracket. Removable securement of a boss in the bracket permits interchanging a boss for a different kind of boss. In this manner, a boss can be interchanged with another boss for use with a different fastening means. Different fastening means may be different in size, in type or both. Fastening means include, for example, screws, bolts, nails, rivets, etc. It is even possible to glue the bracket to the vertical surface. Preferably, brackets are mounted by means of screws inserted through the apertures (or bosses) of the bracket.

A boss in its aperture may be flush with the bracket surface on both faces of a bracket side, or may be raised from the surface on one or both faces. Preferably, the boss is flush with the interior or front surface and raised from the exterior or rear surface. Such an arrangement permits mounting of the bracket on an uneven wall or the like since the exterior or rear surface faces the wall when the bracket is mounted. A smooth surface and streamlined appearance is presented on the visible (interior or front) faces of the bracket. The boss may be beveled at one end adjacent the interior or front surface of the bracket side in order to countersink the fastening means to maintain the smooth surface and streamlined appearance on the visible faces.

Mounting points may be located on one, two or all three of the sides or bracket surfaces. Where mounting points are located on more than one side or bracket surface, the bracket may be mounted through any of the sides with mounting points. Having mounting points on all three sides or bracket surfaces, provides greater versatility to the bracket and provides a more symmetrical appearance. For mounting the bracket in a corner where two surfaces meet (for example where two walls meet), having mounting points on more than one side is particularly advantageous. The mounting points on one side, or bracket surface, are preferably close to the ends of the bracket, preferably equidistant from their respective ends.

Brackets of the present invention may be made of any suitable material, for example plastic, wood, metal, glass or composites. The type of material used depends on the desired application. Where strength is required, such as in shelving for a workshop, metal may be more appropriate. Where strength and elegance is required, such as in shelving for a library or study, a fine wood may be more appropriate. For reason of safety and/or aesthetics, edges and corners may be rounded or contoured.

Brackets of the present invention may be formed as a single, integrally formed piece, or may be constructed from several pieces and the pieces rigidly attached. In respect of glass, plastics and plastic composites, for example, it is possible to make a mold and make an integrally formed piece by molding. With wood and metal, for example, it is generally easier to form individual sides and then rigidly attach the sides to each other, for example with glue or by welding. In one embodiment, two brackets may be "fused" together on one side so that both brackets share a common side.

A side, or bracket surface, of the bracket has inside and outside edges that may be of any desired shape and/or cross-sectional profile. The inside edge may have the same or different shape as the outside edge. For example, the edges may be straight or curved. Curves may be simple or complex. The side, or bracket surface, also has a width, which can be of any magnitude provided the bracket retains a fully open corner and the sides do not interfere with each other. The ends of the sides may be a single edge spanning the width of the side, or may be some other shape having multiple edges, for example an arrowhead. Whatever the shape of the ends, the ends of the sides should conveniently meet so that the sides may be rigidly attached together.

The sides, or bracket surfaces, may comprise other functional or ornamental features. For example, holes may be present for accepting rods or bars when the bracket is used to support rods or bars, or for purely ornamental purposes. Where all three sides, or bracket surfaces, have the same shape, cross-sectional profile, width and other functional or ornamental details, the bracket has three-fold rotational symmetry and the bracket can be used to equal effect in any of the three orientations.

A bracket of the present invention advantageously has a fully open corner allowing easy access to mounting points and accommodating the corner of a support structure resting on the bracket. The mounting points are fully exposed for ease of inserting fastening means. Additionally, integral diagonal bracing provides strength and stability for supporting heavy loads, thereby preventing racking after a support structure has been installed. Also, a built-in end stop helps prevent the support structure from sliding off the bracket and acts as a "bookend" for objects resting on the support structure when the bracket is used as an end bracket.

Brackets of the present invention advantageously provide great versatility. They may be easily mounted on any surface at any location on the surface. The locations of the mounting points on the bracket are such that all the mounting points are easily accessible whether or not the bracket is mounted in, close to or far from a corner. The brackets are particularly useful for supporting such support structures as shelves, poles (e.g. hanger bars, rail rods, etc.), bins and the like.

While the brackets may be used to support the support structures in any orientation on any surface, a preferred arrangement is one in which the support structures are supported in a horizontal orientation on a vertical surface. Vertical surfaces include, for example, walls, posts, studs, beams, sides of furniture, trees, etc. The brackets may even be used to construct free-standing shelving and display units when used in conjunction with top, bottom and/or back panels. Accessories, for example suction cups, edge clip glides, etc. may be used in conjunction with support structures such as glass shelving and the like.

The brackets may be used in a variety of orientations (e.g. "upside down" or "right side up") to present the most aesthetically appealing configuration and to accommodate different kinds of support structures. They can be mounted in spaced-apart configuration, for example at each end of a support structure, or they can be conveniently mounted next to each other (e.g. a side-by-side arrangement) in order to mount a variety of kinds and shapes of support structures. In a side-by-side arrangement, two brackets may be "fused" together on one side so that both brackets share a common side.

Brackets can be used in a nested arrangement, for example a smaller one inside a larger one, or facing in the opposite or same direction. Nested arrangements are particularly useful where one type of support structure is mounted in conjunction with a second type of support structure. For example, a storage bin may be mounted between two spaced-apart brackets, the two-spaced-apart brackets being nested within two larger spaced-apart brackets, the larger spaced-apart brackets being used to mount a shelf above the storage bin.

Brackets may be mounted in corners where two surfaces meet, or indeed where three surfaces meet (e.g. two vertical surfaces and a horizontal surface), or they can be mounted in the middle of a surface (e.g. in the middle of a vertical surface). When used in an end mount, above-shelf configuration, the bracket sets a shelf out to provide an opening for the passage of wires, cables and the like between the shelf and, for example a wall surface.

When properly mounted on a vertical surface such as a wall, the bracket of the instant invention presents diagonally on the vertical surface. Such an appearance arises from the angle that the transverse axis makes with the cross-sectional plane through the longitudinal axes or from the manner in which the bracket surfaces are defined on the first, second and third planes. The diagonal presentation is independent of the shape of the sides or bracket surfaces. In contrast, conventional brackets present vertically or horizontally.

The brackets may be used in any market segment. The brackets are simple enough to be installed by even the least mechanically inclined of individuals, yet are so versatile, robust and aesthetically appealing that commercial and industrial contractors can use them extensively in all manner of applications.

The brackets may also be used as reinforcing cleats for boxes, walls and the like. For boxes, a bracket may be placed over any or all corners where three perpendicular sides or three perpendicular frame elements of the box meet. The brackets may be then attached to the sides or frame elements by screws, nails or the like. Metal strapping normally used to secure boxes for shipping is not needed, thereby eliminating the problem of disposing of cut metal strapping after the box is unpacked. Brackets of the present invention may be re-used as corner cleats thereby reducing packing expenses. For walls, brackets may be placed over the corners where vertical and horizontal wall studs meet, and then secured to the studs by screws, nails or the like. Such an arrangement provides added stability against hurricanes, earthquakes and other violent events.

Further features of the invention will be described or will become apparent in the course of the following detailed description.

BRIEF DESCRIPTION OF THE DRAWINGS

In order that the invention may be more clearly understood, a preferred embodiment thereof will now be described in detail by way of example, with reference to the accompanying drawings, in which:

FIG. 3A is a side view of the bracket of FIG. 1;

DETAILED DESCRIPTION OF PREFERRED EMBODIMENTS

Figure 1:
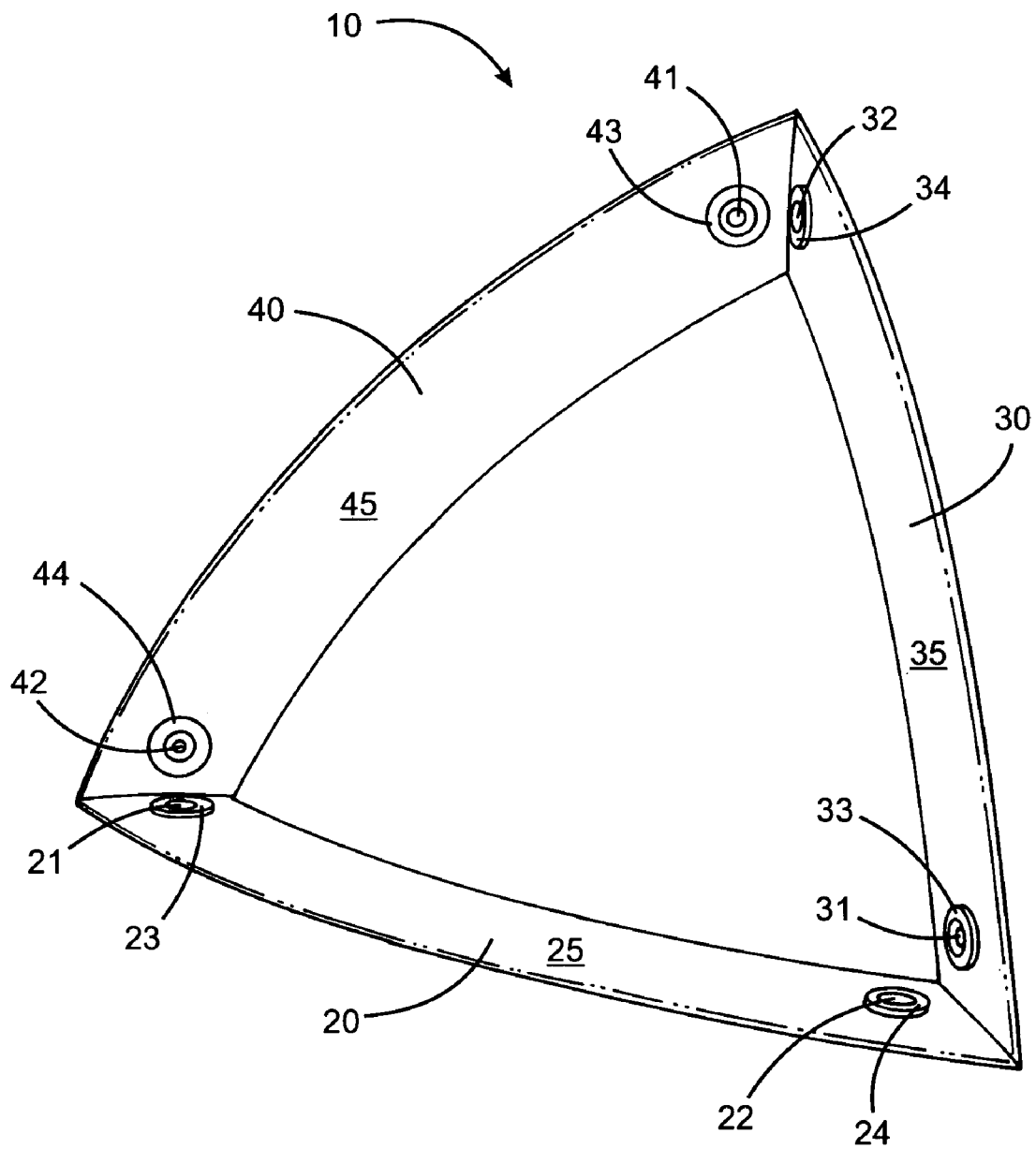
FIG. 1 is a perspective view of a first embodiment of a bracket of the present invention.

Referring to FIG. 1, a first embodiment of a shelf bracket generally shown at 10 comprises three rigid sides 20,30,40 of equal length having front (interior) faces 25,35,45 and rear (exterior) faces (not shown). The sides are rigidly joined at their ends such that one end of side 20 is joined to one end of side 30, the other end of side 30 is joined to one end of side 40, and the other end of side 40 is joined to the other end of side 20. In this manner, the sides are joined to form an equilateral triangle.

Side 20 has two apertures 21,22 having respective mounting bosses 23,24 for receiving screws to permit mounting of the bracket to a wall. Likewise, side 30 has two apertures 31,32 having respective mounting bosses 33,34 and side 40 has two apertures 41,42 having respective mounting bosses 43,44. The bosses are beveled at the front faces so that the heads of the screws may be countersunk below the front faces of the sides. The bracket may be mounted to the wall through any of the sides. If the bracket is mounted in a corner where two walls meet, the bracket may be mounted to both walls.

The three sides 20,30,40 have identical arcuate shapes and have apertures in the same locations on each side. The bracket is fully open; an object may pass entirely through the middle of the bracket from the front to the rear. The bracket has complete 3-fold symmetry. The angular relationship of the sides is discussed in more detail below with reference to FIG. 2D.

Figure 2A:
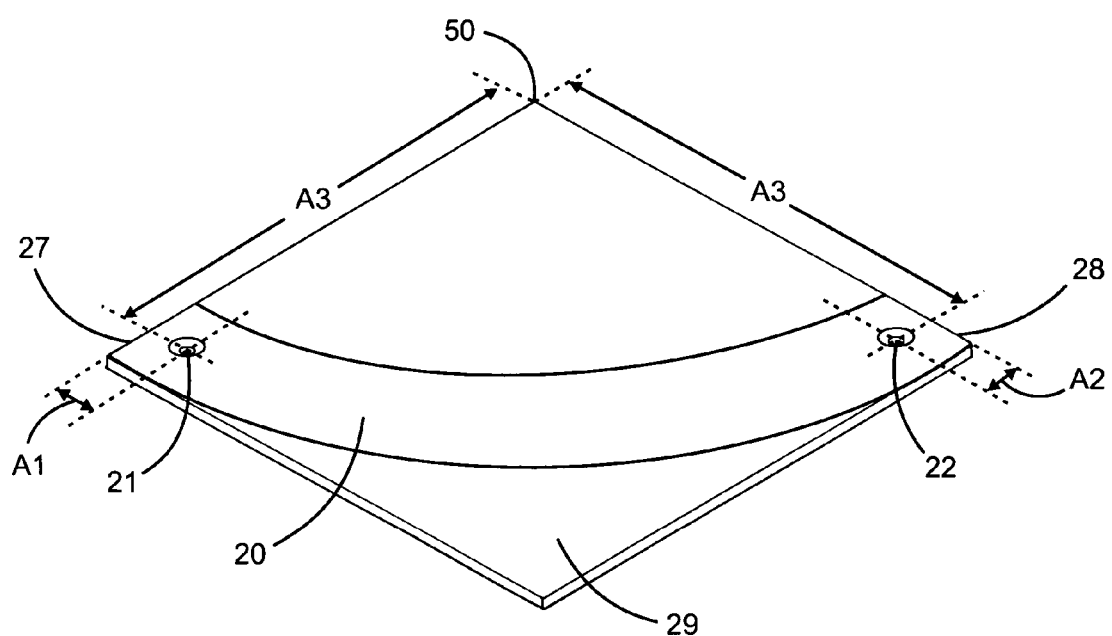
FIGS. 2A-2C is a pictorial representation of the manner in which the bracket of FIG. 1 is constructed.
Figure 2B:
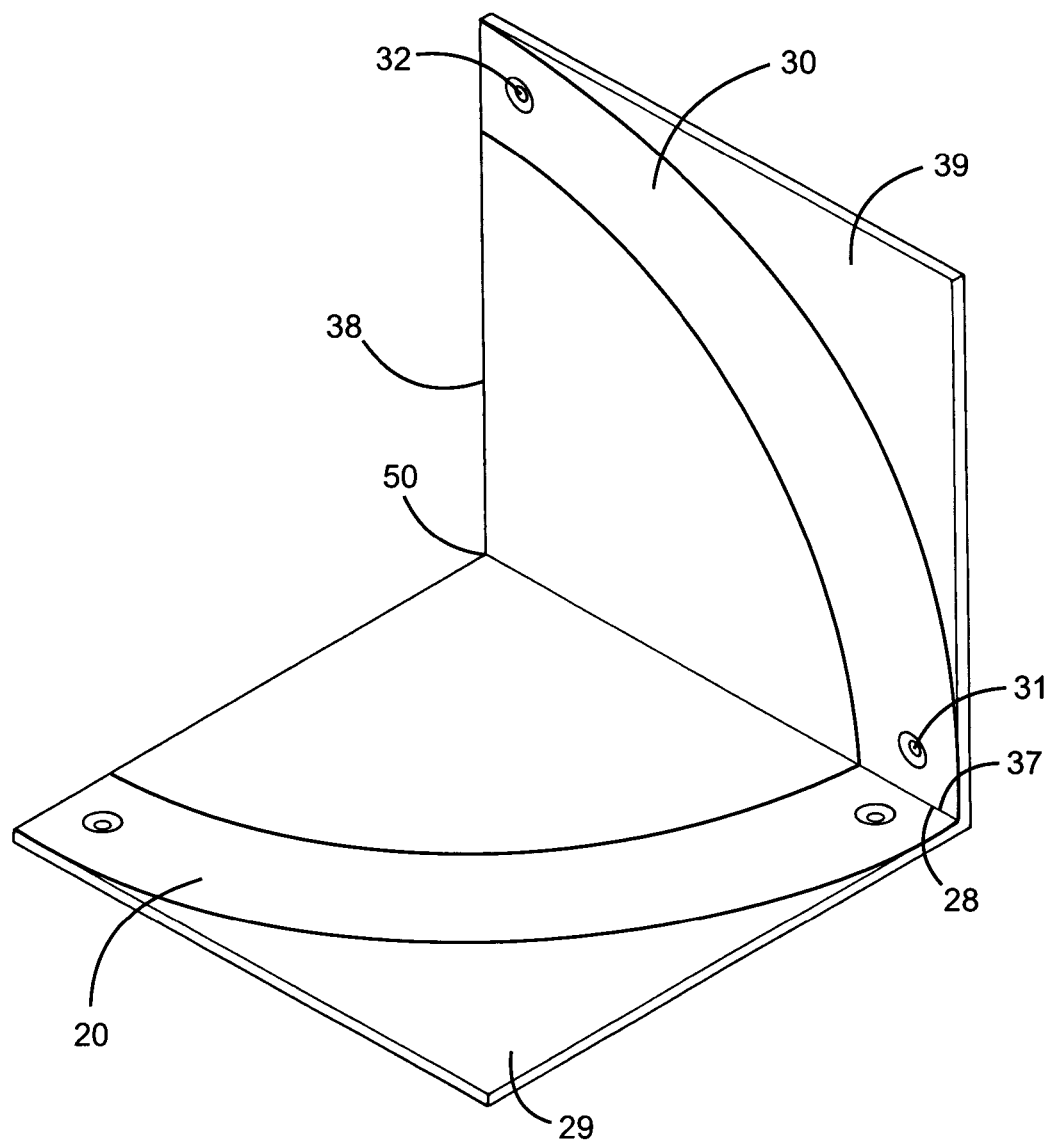
Figure 2C:
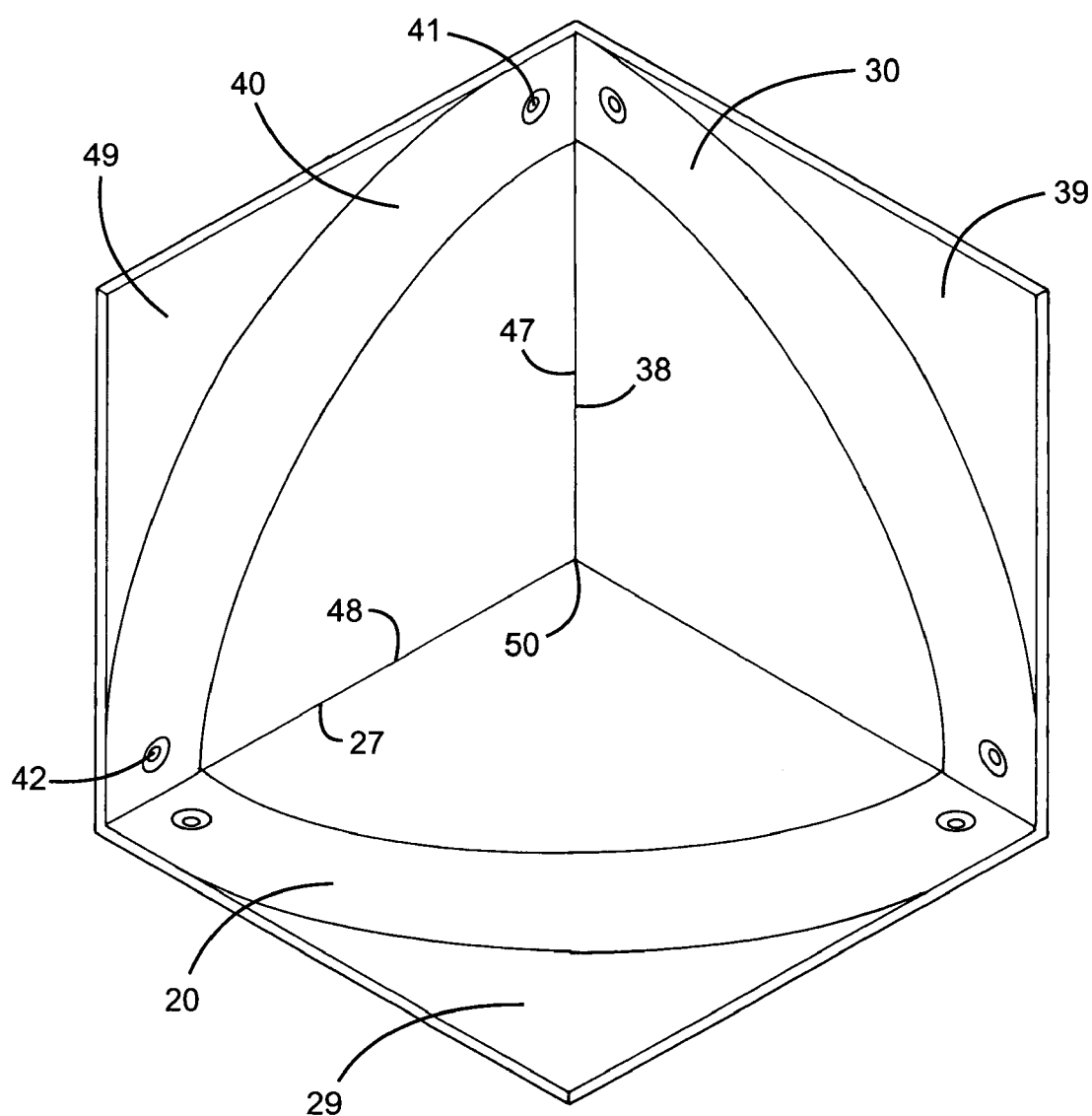

FIGS. 2A-2C illustrate a method by which the bracket of FIG. 1 may be constructed. As shown in FIG. 2A, a first generally planar piece of square rigid stock material 29 is provided having two edges 27,28 meeting at a right angle at an origin 50. The side 20 is defined on the first stock material wherein one end of the side 20 is defined by a segment of the edge 27 and the other end of the side 20 is defined by a segment of the edge 28. Apertures 21,22 are defined such that the center of aperture 21 is perpendicularly offset from edge 27 by a distance A1 and the center of aperture 22 is perpendicularly offset from edge 28 by a distance A2, where A1=A2. Apertures 21,22 are also defined such that the centers of aperture 21 and 22 are each a distance A3 from the origin 50.

For side 30, a second generally planar piece of square rigid stock material 39 is provided having edges 37,38. The second stock material 39 is set up orthogonal to the first stock material 29 such that edge 37 abuts edge 28 and edges 37,38 also meet at the origin 50. Side 20 is then reflected onto the second stock material 39 to define side 30 in precisely the correct position including apertures 31,32.

For side 40, a third generally planar piece of square rigid stock material 49 is provided having edges 47,48. The third stock material 49 is set up orthogonal to both the first stock material 29 and the second stock material 39 such that edge 47 abuts edge 38 and edge 48 abuts edge 27, and edges 47,48 also meet at the origin 50. Side 20 is then reflected onto the third stock material 49 to define side 40 in precisely the correct position including apertures 41,42. Alternatively, side 30 could be reflected onto the third stock material 49 to define side 40, and still result in side 40 being correctly positioned on the third stock material 49.

It can be seen from FIGS. 2A-2C that constructing the bracket in this manner automatically results in the ends of the sides meeting in the desired arrangement. Each side may then be cut out of its respective stock material and the ends rigidly connected, for example by welding or by an adhesive, to form the finished bracket.

In embodiments of the bracket where the sides are of different shape, the method above may be modified by defining the positions of the apertures on the first stock material, reflecting these positions on to the second and third stock materials, and then defining the shapes of the different sides on the three pieces of stock material such that the ends of the sides properly meet along the edges of the stock material. The sides may then be cut from the stock material and rigidly connected.

It will be appreciated by one skilled in the art that the foregoing methods may be obviated by using automated cutting equipment. Cutting parameters based on the desired final design of the bracket may be programmed into an automated cutting machine, which then cuts the sides from stock material. Automated cutting equipment is especially useful for high volume output. For brackets having sides of different shape, automated cutting equipment may be programmed to cut differently shaped sides while ensuring that the ends of the sides still meet in the desired arrangement.

It will also be appreciated by one skilled in the art that moulds may be used for casting or molding individual sides or entire one-piece brackets. Moulds are especially useful for creating brackets in which the sides are integrally formed with one another. Injection molding and die-casting are preferred methods of molding.

Figure 2D:
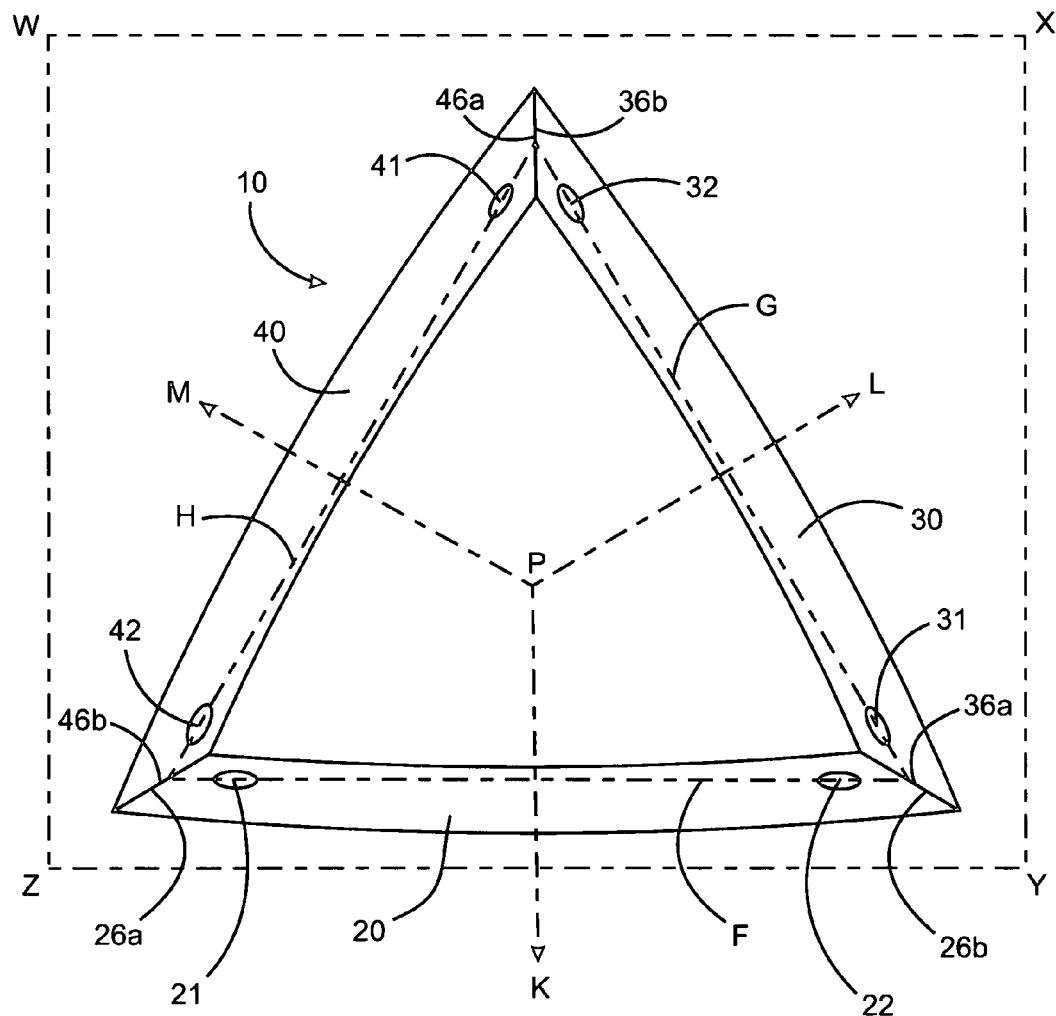
FIG. 2D is a front perspective view of the bracket of FIG. 1 showing the relationship between transverse axes on the sides of the bracket and a cross-sectional plane through longitudinal axes on the sides of the bracket.

Referring to FIG. 2D, the side 20 of bracket 10 is defined by first and second ends 26a,26b lying in a plane defined by longitudinal axis F passing through the center of apertures 21,22 and transverse axis K perpendicular to longitudinal axis F. Similarly, the side 30 is defined by first and second ends 36a,36b lying in a plane defined by longitudinal axis G passing through the center of apertures 31,32 and transverse axis L perpendicular to longitudinal axis G. Similarly, the side 40 is defined by first and second ends 46a,46b lying in a plane defined by longitudinal axis H passing through the center of apertures 41,42 and transverse axis M perpendicular to longitudinal axis H. A cross-sectional plane W,X,Y,Z taken through longitudinal axes F,G,H is shown showing that the bracket forms an equilateral triangle in the cross-sectional plane. The transverse axes K,L,M meet at a common point P behind the bracket not on the cross-sectional plane. Each of the transverse axes forms an angle of about 52° with the cross-sectional plane. The precise angle will vary within manufacturing tolerances.

Referring to FIGS. 3A-3D, the bracket 10 and parts of the bracket 10 are depicted. In a side view of the bracket looking straight at the exterior (rear) face of side 20 (FIG. 3A) it is evident that adjacent sides 30,40 are perpendicular to each other with side 20 forming the hypoteneuse of a right angle triangle. Similar relationships would be evident in side views looking straight at the exterior (rear) faces of each of the other two sides. It should be noted that when the bracket is viewed from the front or rear, rather than the side, the three sides form an equilateral triangle as described previously. Mounting bosses 23,24 are also shown. It can be seen from FIG. 3C that the mounting bosses are flush with the interior (front) faces of the sides and are raised from the exterior (rear) faces.

An end cross-sectional view (FIG. 3B) of side 20 of bracket 10 illustrates an elliptical shape of the side 20 in cross-section. Sides 30,40 have the same cross-sectional shape.

Figure 3B:
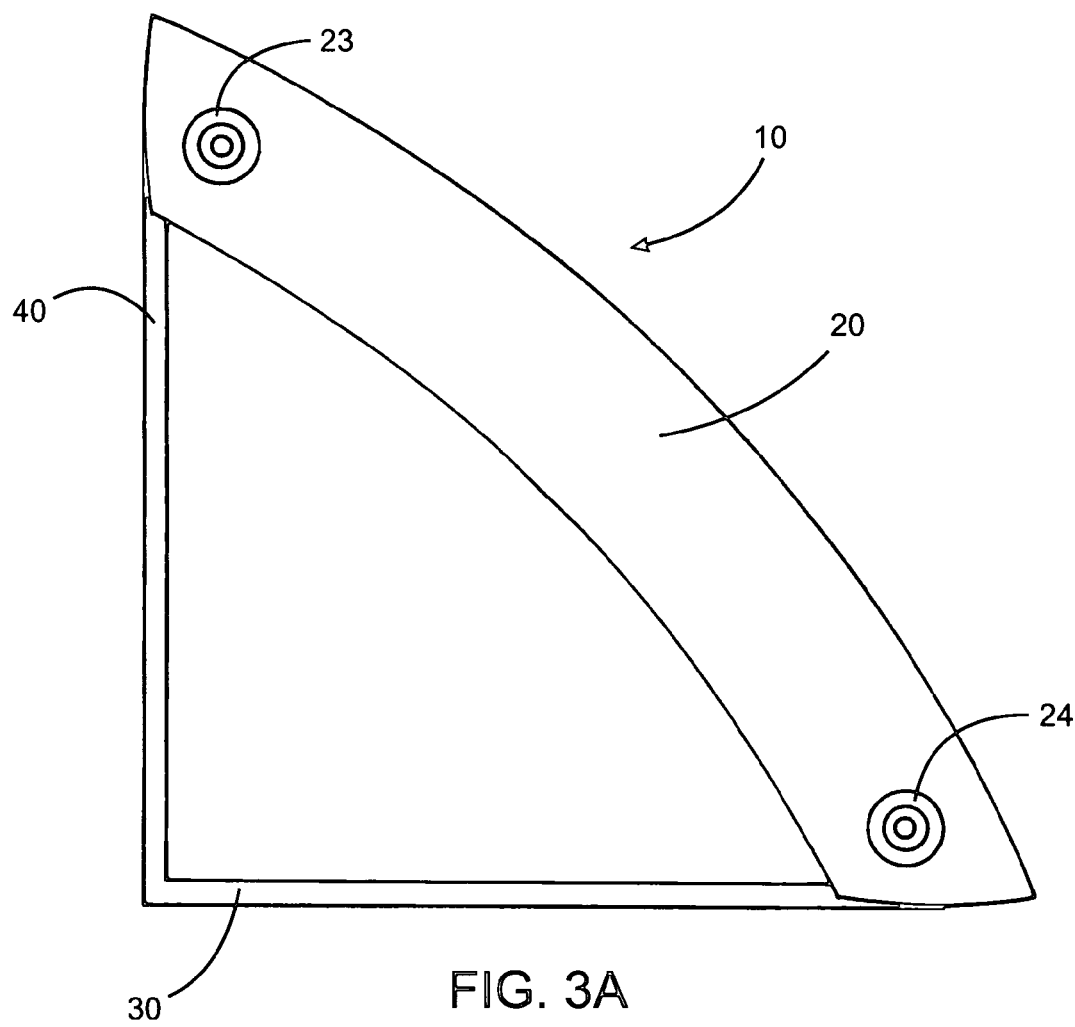
FIG. 3B is an end cross-sectional view of one side of the bracket of FIG. 3A.
Figure 3B:
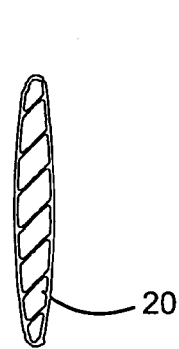
Figure 3C:
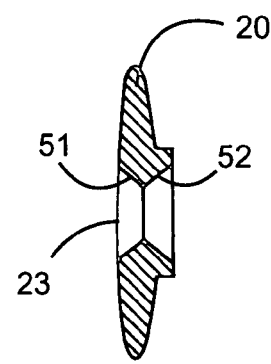
FIG. 3C is a side cross-sectional view of a mounting boss shown in FIG. 3A.
Figure 3D:
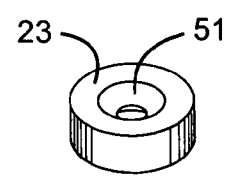
FIG. 3D is a perspective view of the mounting boss of FIG. 3C.

A side view of one of the mounting boss 23 (FIG. 3C) more clearly shows the bevel 51 of the mounting boss 23 located at the front face of the side. The mounting boss 23 also has a bevel 52 located at the rear face of the side so that screws may be inserted from either face and still be countersunk. All of the mounting bosses are constructed in this manner. FIG. 3D is a perspective view of the mounting boss 23 depicted in FIG. 3C showing the bevel 51.

Figure 4:
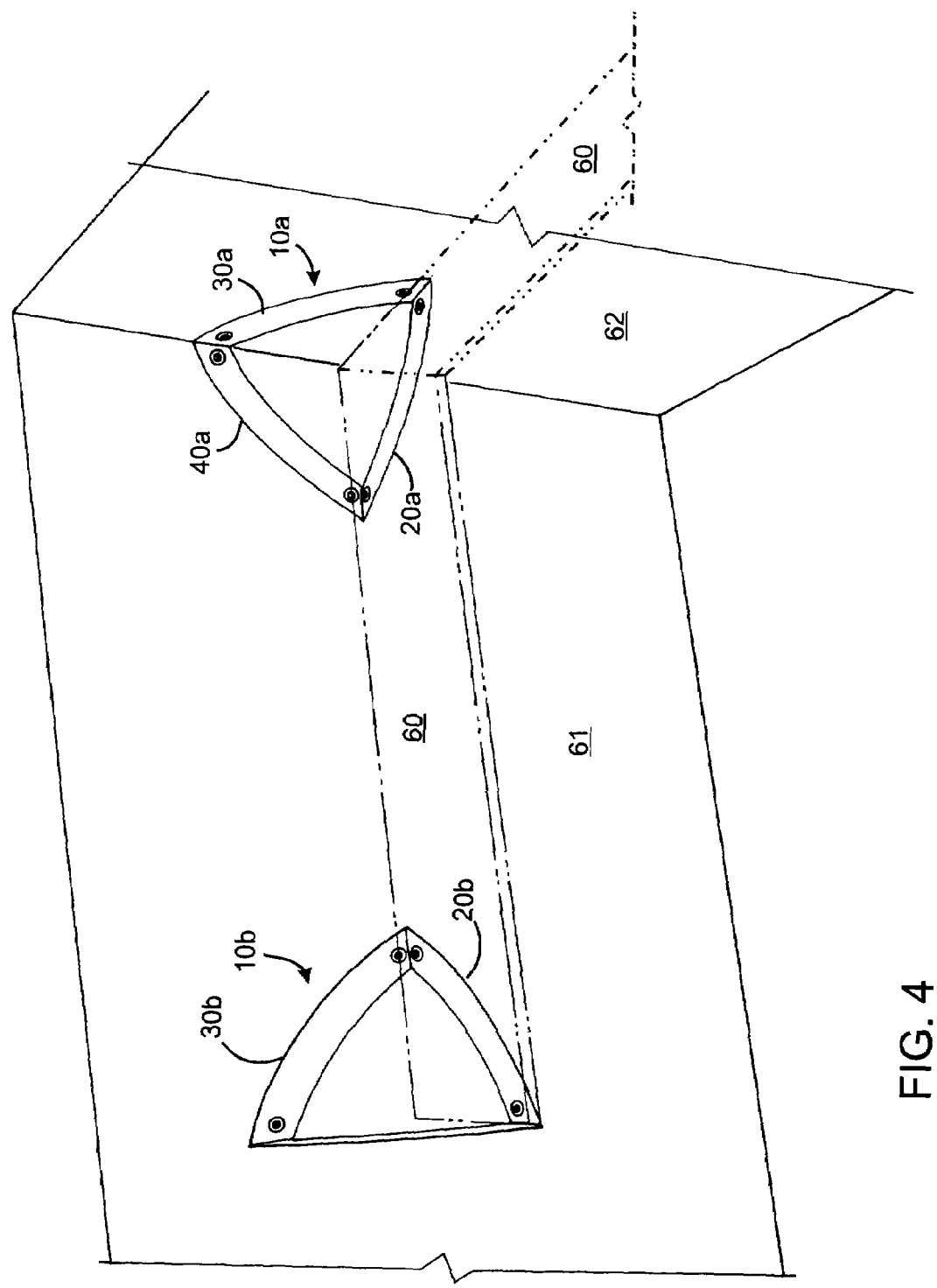
FIG. 4 is a front perspective view of two brackets of FIG. 1 in an arrangement supporting an L-shaped shelf on a wall, one of the brackets in a corner where two walls meet.

FIG. 4 shows an arrangement in which brackets 10a,10b are used to support a rectangular shelf 60 on a first wall 61 in a corner where first wall 61 meets a second wall 62. The brackets are oriented in an "right side up" orientation in a spaced-apart configuration whereby the shelf 60 rests on the front faces of lower sides 20a,20b. Bracket 10a in the corner is fastened to the first wall 61 by screws through mounting bosses of side 40a and is fastened to the second wall 62 by screws through mounting bosses of side 30a. Bracket 10b is fastened to the first wall 61 by screws through mounting bosses of side 30b. The back corners of the shelf 60 are conveniently accommodated in the open bracket.

Figure 5A:
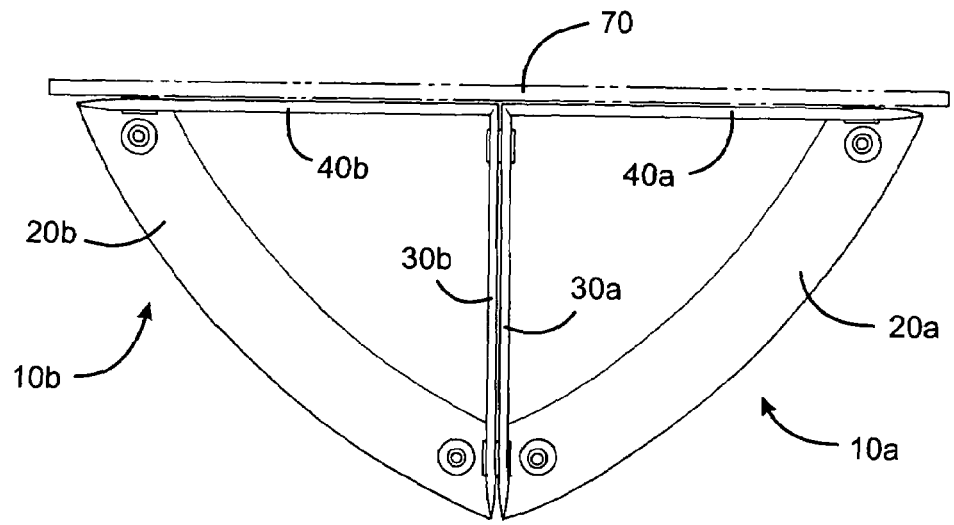
FIG. 5A is a front view of two brackets arranged to support a semi-circular shelf.
Figure 5B:
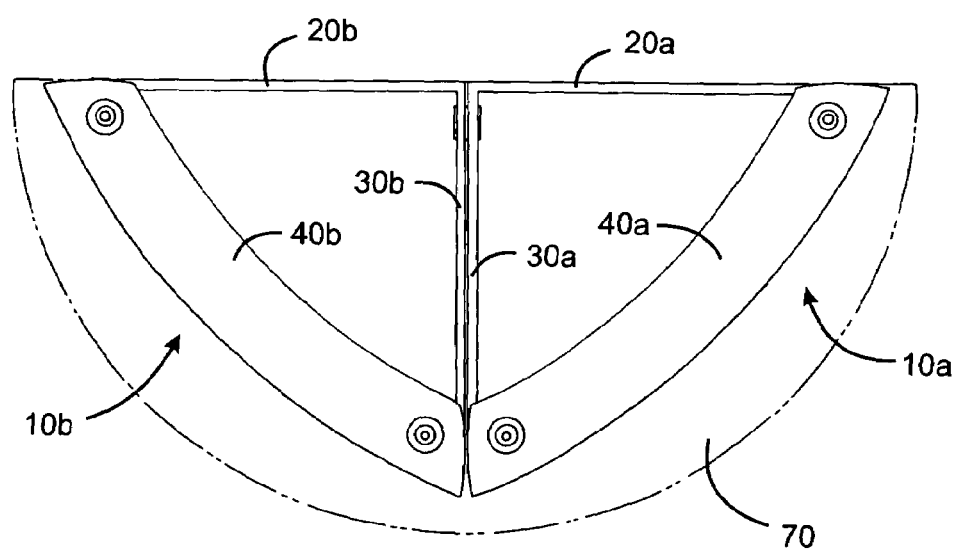
FIG. 5B is a top view of FIG. 5A.

FIGS. 5A and 5B show an arrangement in which brackets 10a,10b are used to support a semicircular shelf 70 on a wall. The brackets are configured next to each other and oriented in an "upside down" orientation whereby the semicircular shelf 70 rests on the rear faces of upper sides 40a,40b. Bracket 10a is fastened to the wall by screws through mounting bosses of side 20a and bracket 10b is fastened to the wall by screws through mounting bosses of side 20b. Brackets 10a and 10b may be fastened to each other by screws or bolts through mounting bosses of sides 30a and 30b, since the mounting bosses of side 30a are aligned with the mounting bosses of side 30b.

Figure 6A:
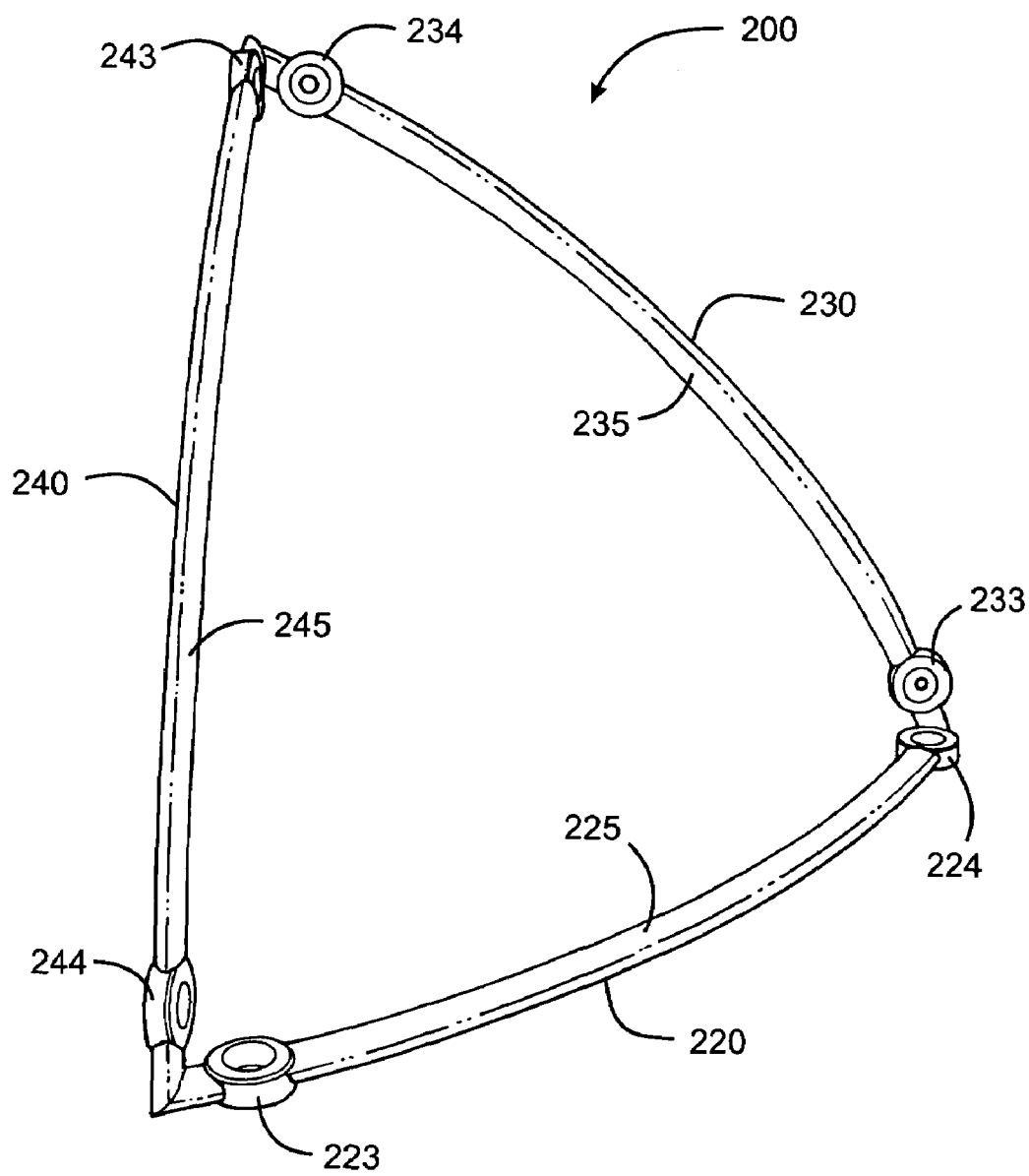
FIG. 6A is a perspective view of a second embodiment of a bracket of the present invention having brackets sides with slimmer profile than in the bracket of FIG. 1.
Figure 6C:
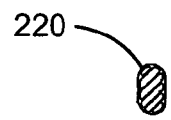
FIG. 6C is an end cross-sectional view of one side of the bracket of FIG. 6B.
Figure 6B:
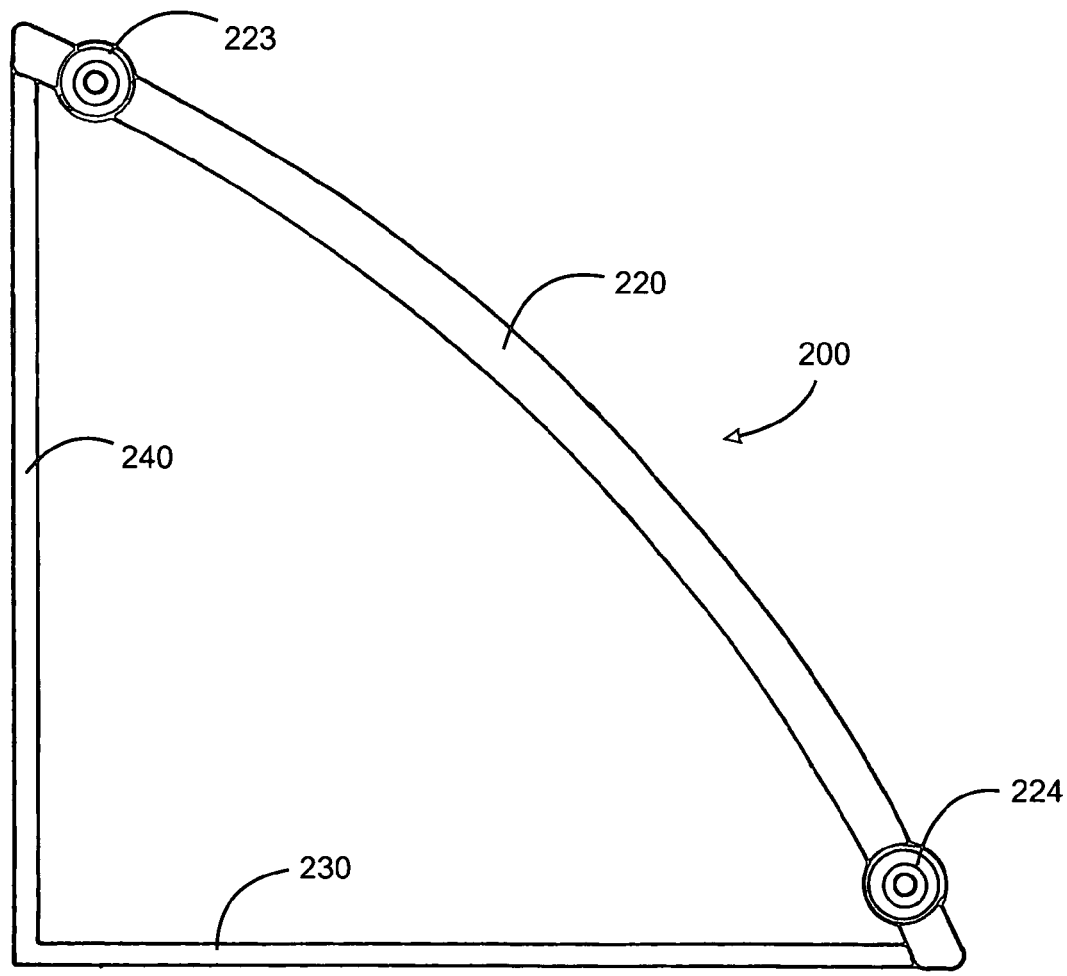
FIG. 6B is a side view of the bracket of FIG. 6A.

Referring to FIGS. 6A-6C, a second embodiment of a shelf bracket generally shown at 200 comprises three rigid sides 220,230,240 of equal length having front (interior) faces 225, 235,245 and rear (exterior) faces (not labeled). The bracket 200 is similar in construction to the bracket 10 of FIG. 1, however, the sides 220,230,240 of bracket 200 have a slimmer profile than the sides 20,30,40 of bracket 10. Because the sides 220,230,240 have a slimmer profile, respective mounting bosses 223,224,233,234,243,244 have a diameter larger than the width of the sides. As best seen in FIG. 6C, the cross-sectional shape of a side 220 of bracket 200 is elliptical, but the ratio of the major to minor axes is smaller than for the sides of bracket 10.

Figure 6D:
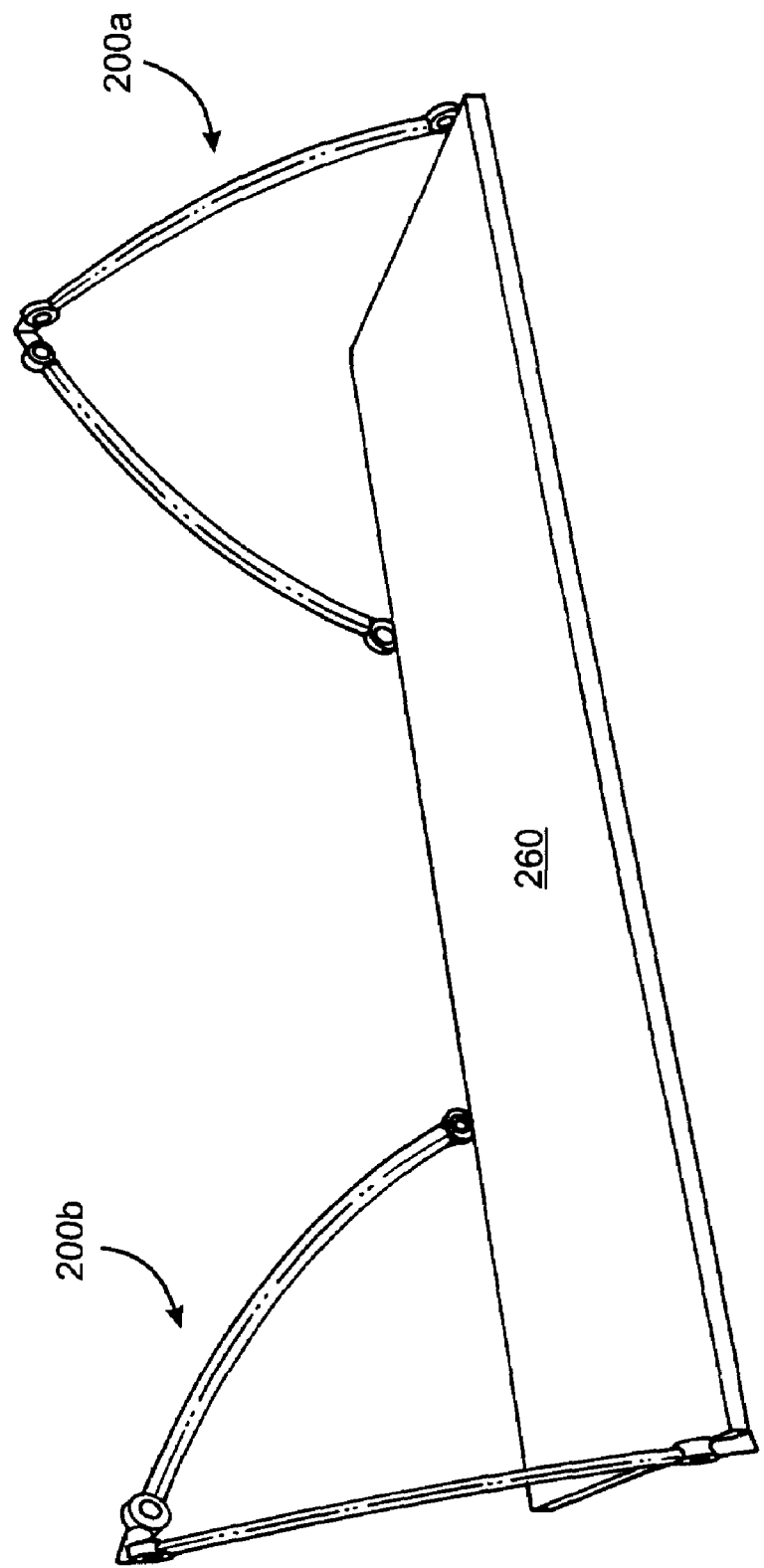
FIG. 6D is a front perspective view of two brackets of FIG. 6A supporting a rectangular shelf.

Referring to FIG. 6D, two brackets 200a,200b are shown supporting a rectangular shelf 260 on a wall. A comparison of FIG. 6D to FIG. 4 shows that the brackets 200a,200b are functionally very similar to the brackets 10a,10b. The slimmer profiles of brackets 200a,200b provide a more unobtrusive appearance.

Figure 7:
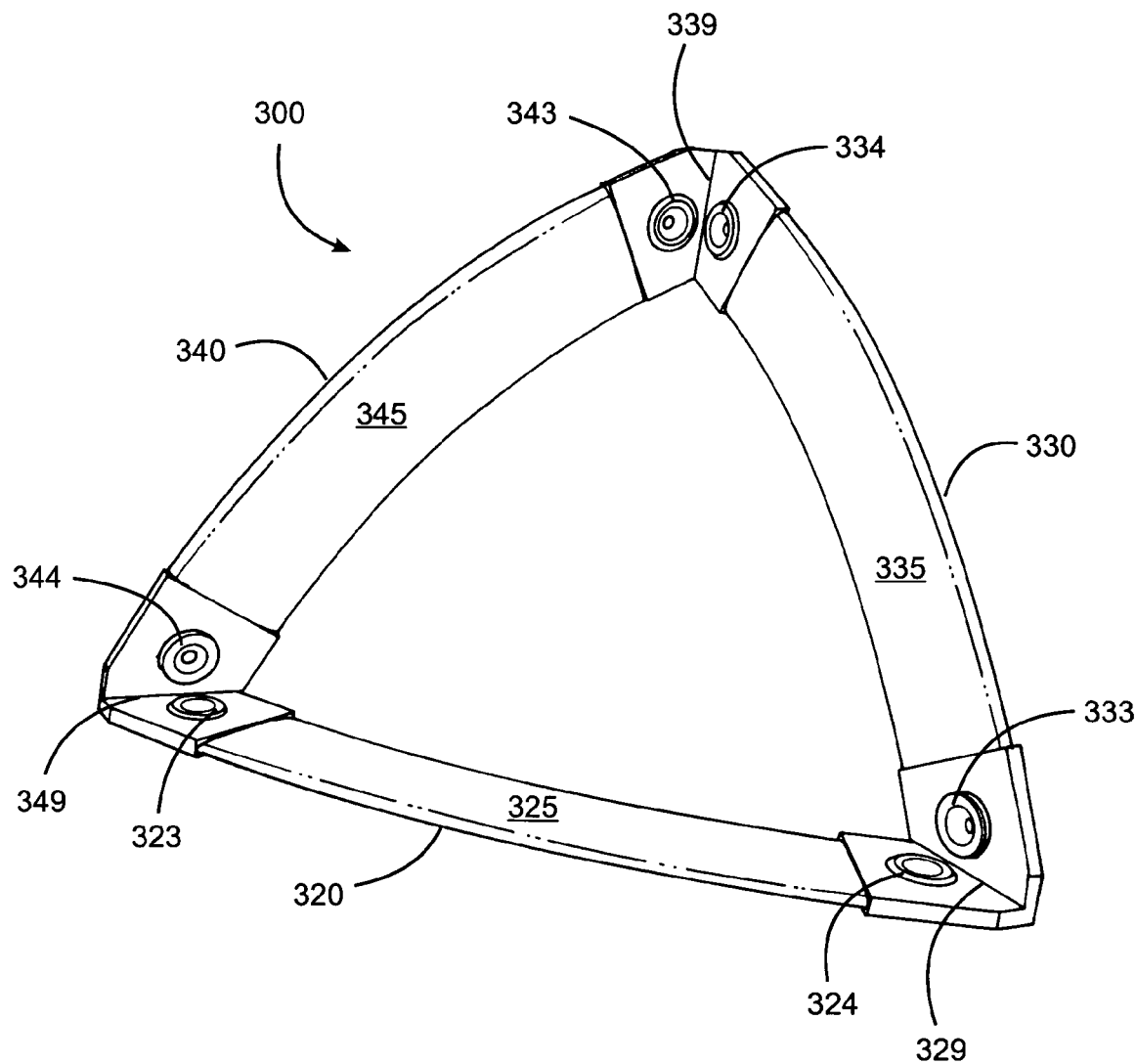
FIG. 7 is a perspective view of a third embodiment of a bracket of the present invention in which each corner of the bracket is formed differently from the bracket of FIG. 1.

Referring to FIG. 7, a third embodiment of a shelf bracket generally shown at 300 comprises three rigid sides 320,330, 340 of equal length having front (interior) faces 325,335,345 and rear (exterior) faces (not shown). The bracket 300 is similar in construction and function to the bracket 10 of FIG. 1, however, the sides 320,330,340 of bracket 300 are joined together differently. In bracket 300 the corner regions 329, 339,349 are integrally joined where the sides 320,330,340 are joined, and are wider and thicker than the sides. Mounting bosses 323,324,333,334,343,344 are located in the corner regions.

Figure 8:
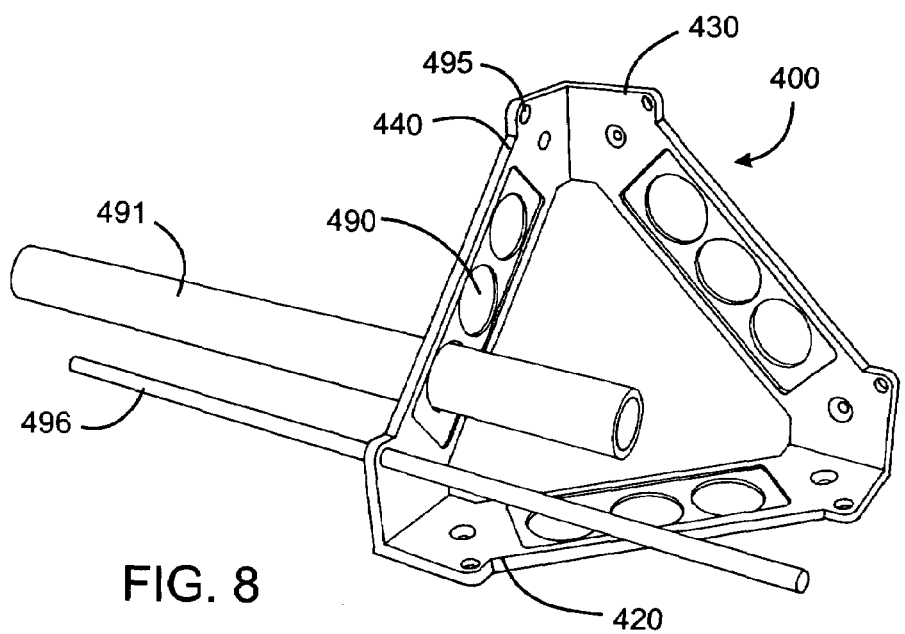
FIG. 8 is a perspective view of a fourth embodiment of a bracket of the present invention, which is suitable for supporting a hanger bar.

Referring to FIG. 8, a fourth embodiment of a bracket of the present invention generally shown at 400 is suitable for supporting a shelf and a hanger bar, for example in a closet. The bracket 400 has three sides 420,430,440, each side comprising a series of hanger bar holes 490 (only one labeled) and shelf railing holes 495 (only one labeled). A hanger bar hole may be used to support a hanger bar 491 and a shelf railing hole may be used to support a shelf railing 496. Preferably, at least two brackets are used so that the hanger bar and/or shelf railing may be supported at either end.

When two brackets of the nature shown in FIG. 8 are mounted on a wall, the hanger bar holes of one side of one of the brackets are aligned with the hanger bar holes of one side of the other bracket by virtue of the symmetrical construction of the brackets. Thus, a hanger bar can be conveniently supported between two brackets. The shelf railing holes are aligned similarly. Any number of brackets may be used to support one hanger bar and/or one shelf railing since the respective holes will all be aligned. Thus, for particularly long hanger bars or shelf railings, a number of brackets may be used at various positions along the bar and/or railing to provide support in the middle. If the brackets are mounted in the "upside down" position, a shelf may be supported on the exterior (rear) surface of side 420.

Figure 9:
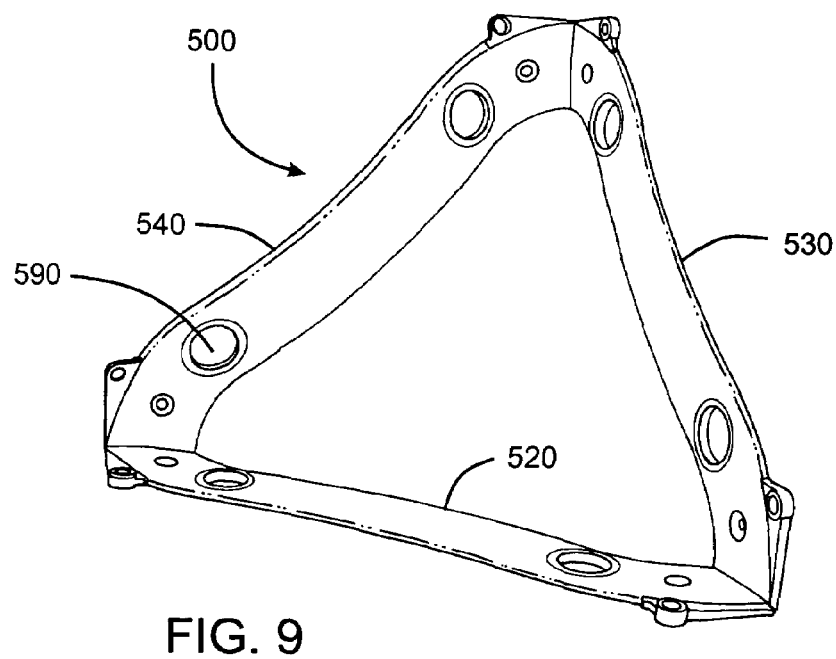
FIG. 9 is a perspective view of a fifth embodiment of a bracket of the present invention, which is suitable for supporting a hanger bar.

Referring to FIG. 9, a fifth embodiment of a bracket of the present invention generally shown at 500 is suitable for supporting a hanger bar. This embodiment is similar to the one depicted in FIG. 8, however, the sides 520,530,540 are of a different shape and there are only two hanger bar holes 590 per side.

Figure 10A:
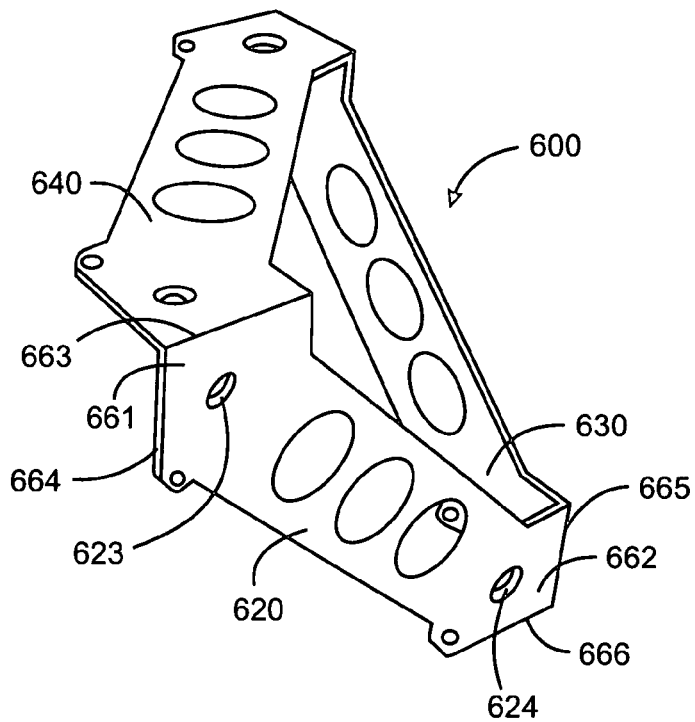
FIG. 10A is a perspective view of a sixth embodiment of a bracket of the present invention.

Referring to FIG. 10A, a sixth embodiment of a bracket of the present invention generally shown at 600 comprises three rigid sides 620,630,640 of equal length, each side having two mounting bosses located in corner regions where the sides are rigidly joined together. The sides 620,630,640 have ends shaped like arrowheads in which two edges of each end of one of the sides meet at points on a longitudinal axis through the middle of the mounting bosses of that side. For example, ends 661 and 662 of side 620 have edges 663,664 and 665,666, respectively. The edges 663,664 meet at a point on a longitudinal axis through mounting bosses 623,624, and edges 665, 666 meet at a point on the longitudinal axis through mounting bosses 623,624. The sides of the bracket are joined together at their respective ends along one of the two edges at each end of each side. Such an arrangement provides a somewhat different appearance and is particularly useful for supporting a storage bin (see FIG. 10C).

Figure 10B:
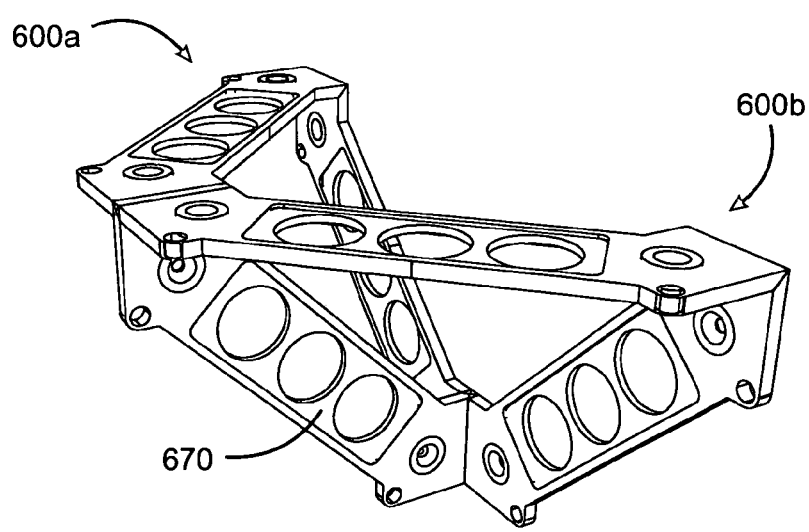
FIG. 10B is a perspective view of two brackets of FIG. 10A fused together in a side-by-side arrangement in which the two brackets share a common side.

FIG. 10B illustrates an embodiment in which two brackets 600a,600b of the type shown in FIG. 10A are fused together in a side-by-side arrangement to share a common side 670. Such an arrangement is similar to that shown in FIGS. 5A and 5B, except that in the embodiment of FIG. 10B, the two brackets are physically inseperable without damaging the brackets.

Figure 10C:
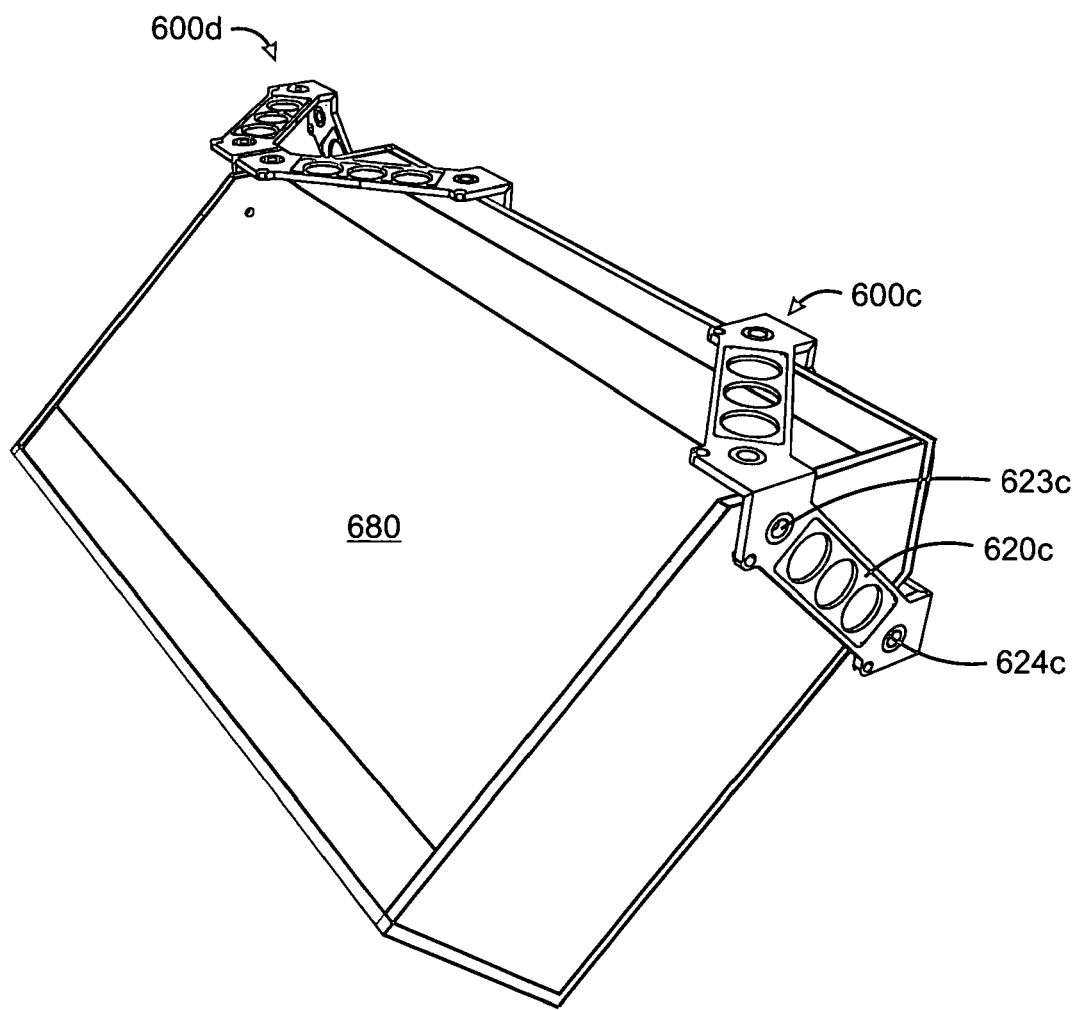
FIG. 10C is a perspective view of two brackets of FIG. 10A supporting a storage bin.

FIG. 10C shows brackets 600c,600d in spaced-apart configuration supporting a storage bin 680. Bracket 600c is of the type shown in FIG. 10A and bracket 600d is a fused double bracket of the type shown in FIG. 10B. The brackets are mounted in an "upside down" orientation on a vertical surface and back corners of the storage bin fit within the open brackets. If desired, the bracket 600d is able to support a corner of another storage bin next to storage bin 680 on the far side. Storage bin 680 is secured to brackets 600c,600d by bolts through mounting bosses on appropriate sides of the brackets, for example through mounting bosses 623c,624c on side 620c.

Figure 11:
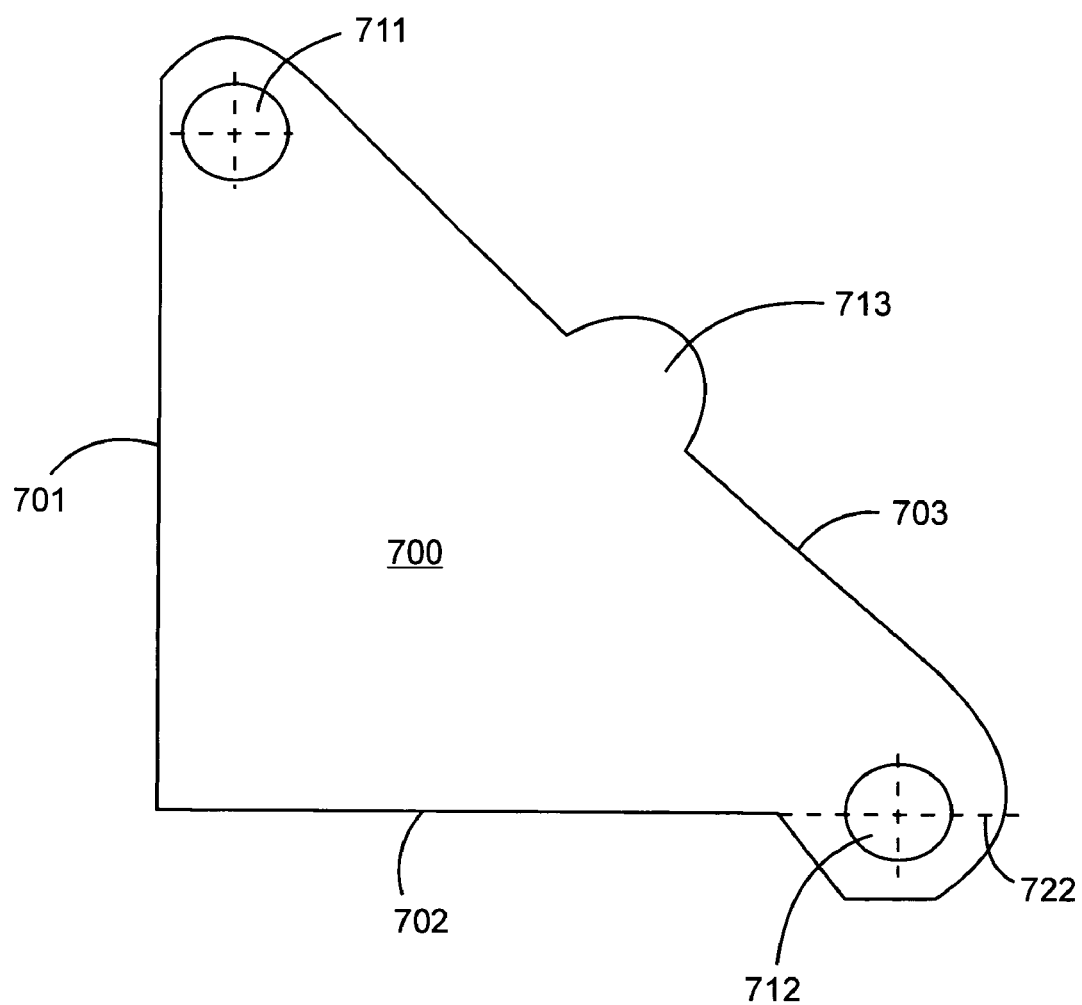
FIG. 11 is a plan view of a template for assisting in mounting a bracket of the present invention to a surface.

Referring to FIG. 11, a template 700 is shown for assisting in mounting a bracket of the present invention to a surface. The template comprises a flat piece of material having a first guide edge 701 perpendicular to a second guide edge 702. A third edge 703, together with edges 701,702 roughly form a triangle. First hole 711 and second hole 712 are positioned on the template so that the holes 711,712 are concentric with the mounting bosses and apertures on a side of the bracket. The second edge 702 is aligned with an axis 722 through the center of the second hole 712. Tab 713 is provided on the third edge.

In use, the template is placed on an exterior side of the bracket with the first and second holes 711,712 of the template over the mounting bosses. The template is held in place by virtue of the raised bosses in the two holes of the template. The template may be placed on the side of the bracket such that the tab 713 points interiorly into the bracket or exteriorly away from the bracket. When the tab 713 points interiorly, the template is ideally used to mount the bracket an "upside down" orientation on a vertical surface since vertical alignment of the first edge 701 or horizontal alignment of the second edge 702 will automatically result in the bracket being correctly oriented. When the tab 713 points exteriorly, the template is ideally used to mount the bracket an "right side up" orientation on a vertical surface since horizontal alignment of the second edge 702 will automatically result in the bracket being correctly oriented. The line of the second edge 702 through the center of the second hole 712 permits determining the proper placement of a fastening means on the vertical surface.

Figure 12A:
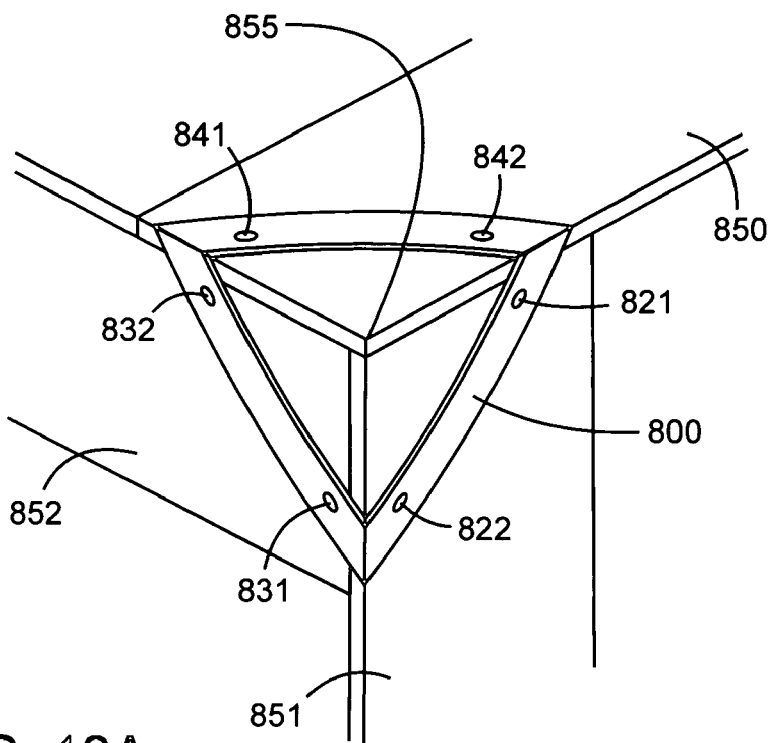
FIG. 12A is a top perspective view of a bracket of the present invention in use as a corner reinforcing cleat.

Referring to FIG. 12A, galvanized metal bracket 800 is used as a corner reinforcing cleat at a corner 855 where three mutually perpendicular studs 850,851,852 meet. Bracket 800 is secured to the studs by screws through apertures 821,822, 831,832,841,842. Corner 855 protrudes through the fully open corner of bracket 800. The studs may be part of a box or part of a wall in a building. For boxes, use of brackets at each corner would replace the use of metal strapping that is currently typically used. For buildings, use of brackets to reinforce wall corners helps stabilize the building against violent episodes such as hurricanes and earthquakes. In a manner similar to that shown in FIG. 2D, bracket 800 forms an equilateral triangle in a cross-sectional plane taken through longitudinal axes passing through the centers of the apertures. Where one stud is particularly longer than the others, it may be beneficial to use a bracket for which an isosceles triangle is formed in the cross-sectional plane.

Figure 12B:
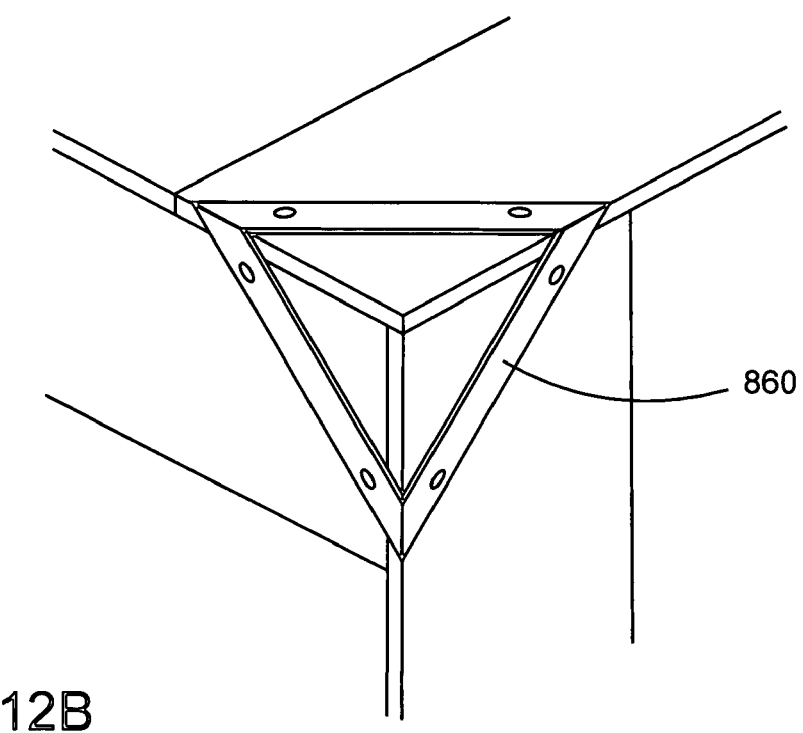
FIG. 12B is a top perspective view of another embodiment of a bracket of the present invention in use as a corner reinforcing cleat.

Referring to FIG. 12B, a bracket 860 shown in use as a corner cleat is similar in construction to the bracket shown in FIG. 12A except that the sides are straight rather than curved.

Figure 13A:
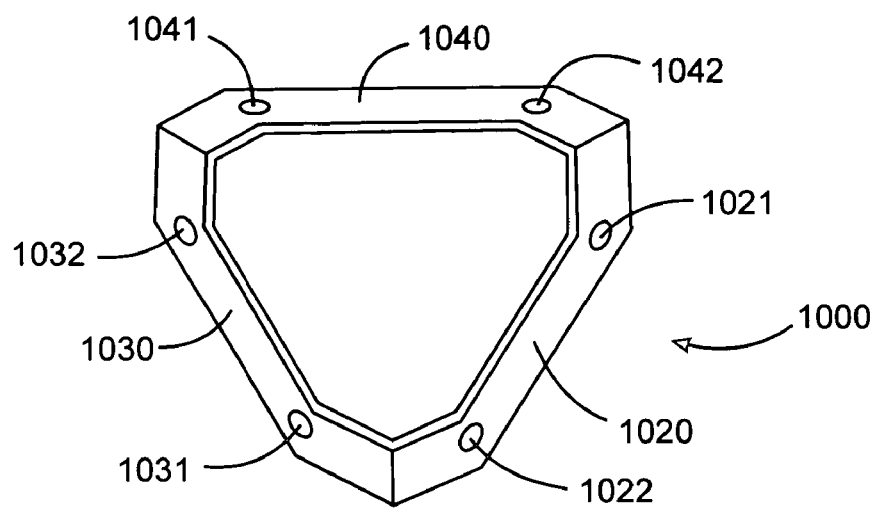
FIG. 13A is a front perspective view of a seventh embodiment of a bracket of the present invention.
Figure 13B:
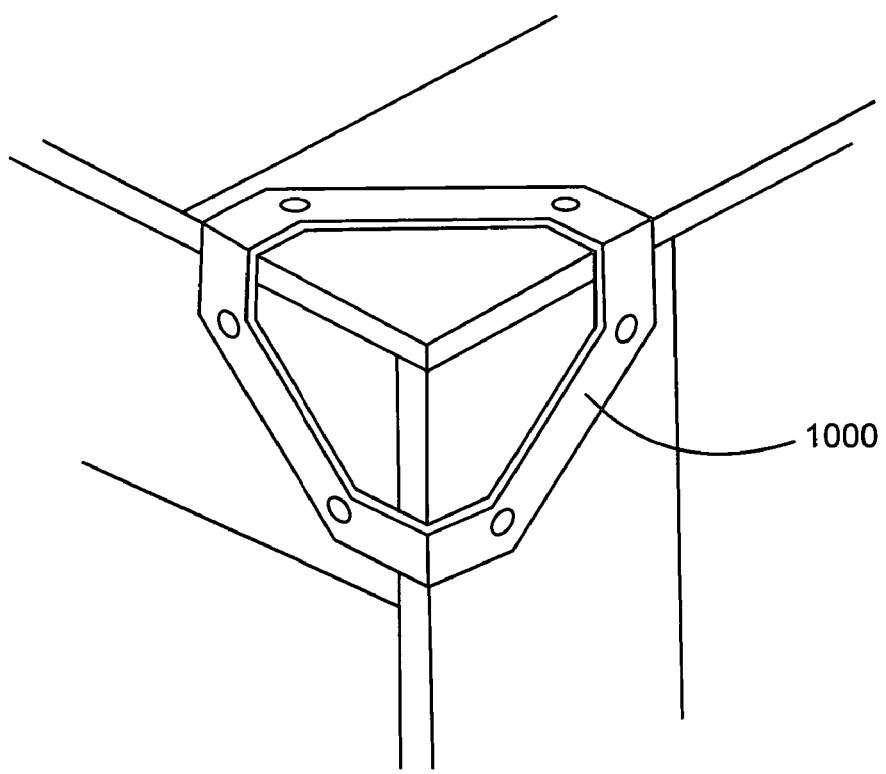
FIG. 13B is a top perspective view of the bracket of FIG. 13A in use as a corner reinforcing cleat.

Referring to FIG. 13A, bracket 1000 of the present invention comprises three rigid sides 1020,1030,1040 rigidly connected at the ends of each side. Sides 1020,1030,1040 are shaped so that the sides generally follow a bent path from end-to-end. Apertures 1021,1022,1031,1032,1041,1042 are set to facilitate use of bracket 1000 as a corner cleat as illustrated in FIG. 13B.

Figure 14A:
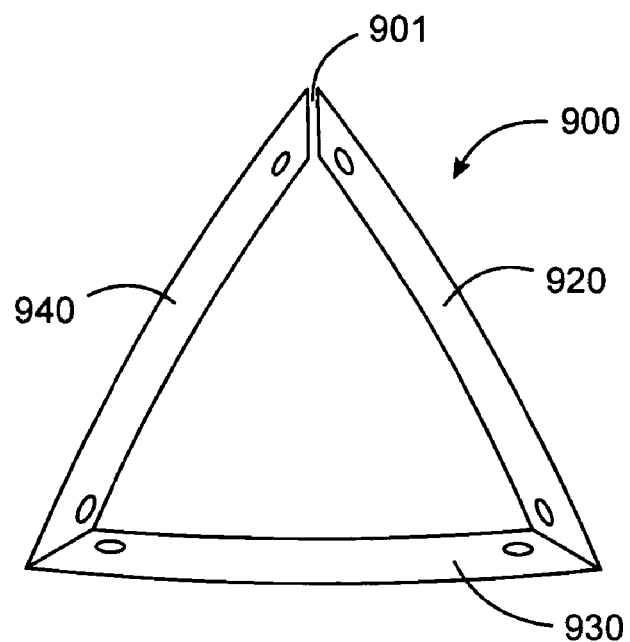
FIG. 14A is a front perspective view of an eighth embodiment of a bracket of the present invention having an open corner; and, FIG. 14B is a front perspective view of a ninth embodiment of a bracket of the present invention having an open side.

Referring to FIG. 14A, bracket 900 is depicted having a break 901 at a corner where side 920 meets side 940. Sides 920 and 940 are integrally formed with side 930. Bracket 900 retains its shape by virtue of the rigidity of sides 920,930,940. Bracket 900 may be formed from a single piece of stock material by die stamping an appropriately shaped blank from the stock and then folding the blank at the corners where sides 920 and 930 and sides 940 and 930 meet.

Figure 14B:
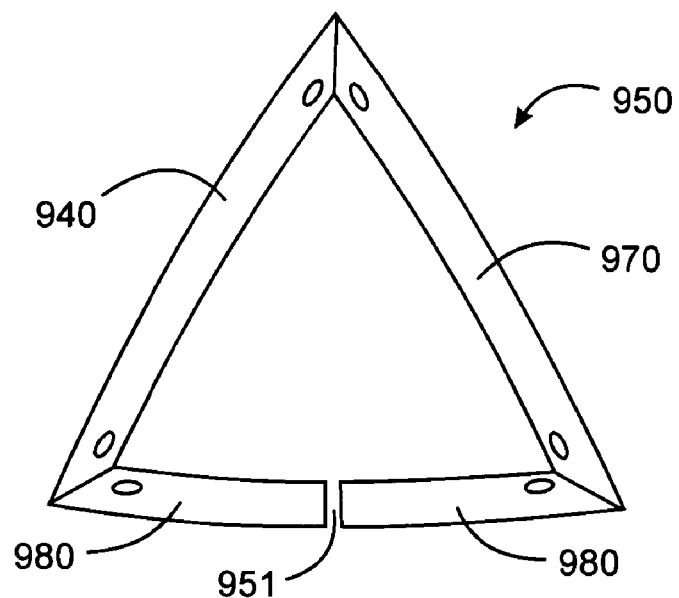

Referring to FIG. 14B, bracket 950 is depicted having a break 951 in side 980. Sides 970 and 990 are integrally formed with side 980 and with each other. Bracket 950 retains its shape by virtue of the rigidity of sides 970,980,990. Bracket 950 may be formed from a single piece of stock material by die stamping an appropriately shaped blank from the stock and then folding the blank at the corners where sides 920 and 930, sides 940 and 930, and sides 920 and 940 meet.

From the foregoing, it will be seen that this invention is one well adapted to attain all the ends and objects hereinabove set forth together with other advantages which are obvious and which are inherent to the structure. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The invention claimed is:

1. A bracket comprising:
   three rigid sides,
   at least two of the sides having equal length,
   each of the three sides having interior and exterior surfaces,
   each of the three sides having first and second ends, the first and second ends of each side lying in a plane defined by a longitudinal axis between the first and second ends and a transverse axis perpendicular to the longitudinal axis,
   the sides being rigidly connected so that an equilateral or isosceles triangle is formed in a cross-sectional plane taken through the longitudinal axes of the three sides, the transverse axes of the three sides each independently forming an angle of from about 50° to about 60° with the cross-sectional plane, the transverse axes of the three sides meeting at a common point not on the cross-sectional plane,
   at least one of the three sides having a first and a second mounting point therethrough, each mounting point along the longitudinal axis of the side, the first mounting point located at a first distance from the first end and the second mounting point located at a second distance from the second end.

2. The bracket of claim 1 having a break in one of the sides or at a corner where two of the sides meet.

3. The bracket of claim 1 having a break in one of the sides.

4. The bracket of claim 1 having a break at a corner where two of the sides meet.

5. The bracket of claim 2, wherein the angle is from 51° to 55°.

6. The bracket of claim 2, wherein the three rigid sides are of equal length and an equilateral triangle is formed in the cross-sectional plane.

7. The bracket of claim 6, wherein the first distance is equal to the second distance.

8. The bracket of claim 6, wherein the three sides each have first and second mounting points.

9. The bracket of claim 6, wherein the mounting points each comprise an aperture having a boss for receiving a fastening means.

10. The bracket of claim 9, wherein the boss is flush with the interior surface and raised from the exterior surface.

11. The bracket of claim 9, wherein the boss is interchangeable with another boss for a different fastening means.

12. The bracket of claim 2, wherein the three sides all have the same shape.

13. A method comprising: providing a structure having a corner where three mutually perpendicular elements meet at a corner; placing a bracket as defined in claim 1 over the corner, attaching the bracket to the elements to reinforce the structure at the corner.

14. The method of claim 13, wherein the three rigid sides of the bracket are continuously connected to each other.

15. The method of claim 13, wherein the structure is a box.

16. The method of claim 13, wherein the structure is a wall.

17. The bracket of claim 1, wherein the three rigid sides are continuously connected to each other at the ends.

18. A bracket, described in reference to three mutually orthogonal axes that meet at an origin, the bracket comprising:
   a first rigid bracket surface lying in a first plane defined by the first and second axis, the first rigid bracket surface having a first and a second mounting point therethrough;
   a second rigid bracket surface lying in a second plane defined by the second and third axis, the second rigid bracket surface having a third and a fourth mounting point therethrough; and
   a third rigid bracket surface lying in a third plane defined by the first and third axis, the third rigid bracket surface having a fifth and a sixth mounting point therethrough;
   each mounting point comprising a boss for receiving a fastening means, each boss mounted in an aperture of the bracket surface to be flush with a front of the bracket surface and to be raised from a rear thereof;
   each bracket surface rigidly connected along an edge thereof to the other two bracket surfaces;
   wherein the first mounting point is perpendicularly offset from the second bracket surface by a first distance and perpendicularly offset from the third bracket surface by a second distance, the second mounting point is perpendicularly offset from the third bracket surface by a distance equal to the first distance and perpendicularly offset from the second bracket surface by a distance equal to the second distance, the third mounting point is perpendicularly offset from the third bracket surface by a distance equal to the first distance and perpendicularly offset from the first bracket surface by a distance equal to the second distance, the fourth mounting point is perpendicularly offset from the first bracket surface by a distance equal to the first distance and perpendicularly offset from the third bracket surface by a distance equal to the second distance, the fifth mounting point is perpendicularly offset from the first bracket surface by a distance equal to the first distance and perpendicularly offset from the second bracket surface by a distance equal to the second distance, and the sixth mounting point is perpendicularly offset from the second bracket surface by a distance equal to the first distance and perpendicularly offset from the first bracket surface by a distance equal to the second distance.

19. The bracket of claim 17, wherein the angle is from 51° to 55°.

20. The bracket of claim 17, wherein the three rigid sides are of equal length and an equilateral triangle is formed in the cross-sectional plane.

21. The bracket of claim 20, wherein the first distance is equal to the second distance.

22. The bracket of claim 20, wherein the three sides each have first and second mounting points.

23. The bracket of claim 20, wherein the mounting points each comprise a boss for receiving a fastening means, contained in an aperture.

24. The bracket of claim 23, wherein the boss is flush with the interior surface and raised from the exterior surface.

25. The bracket of claim 23, wherein the boss is interchangeable with another boss for a different fastening means.

26. The bracket of claim 17, wherein the three sides all have the same shape.

* * * * *